US009831621B2

United States Patent
O'Connell et al.

(10) Patent No.: US 9,831,621 B2
(45) Date of Patent: Nov. 28, 2017

(54) EXTENDABLE CONNECTOR PORT

(71) Applicant: Microsoft Technology Licensing, LLC, Redmond, WA (US)

(72) Inventors: Neil O'Connell, Seattle, WA (US); Ivan Andrew McCracken, Sammamish, WA (US); Kabir Siddiqui, Sammamish, WA (US); Brett Andrew Tomky, Seattle, WA (US); Errol Mark Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/845,032

(22) Filed: Sep. 3, 2015

(65) Prior Publication Data

US 2017/0070017 A1 Mar. 9, 2017

(51) Int. Cl.
*H01R 27/02* (2006.01)
*H01R 13/44* (2006.01)
(Continued)

(52) U.S. Cl.
CPC .......... *H01R 27/02* (2013.01); *G06F 1/1616* (2013.01); *G06F 21/31* (2013.01); *G06F 21/86* (2013.01);
(Continued)

(58) Field of Classification Search
CPC ...... H01R 13/44; H01R 13/447; H01R 24/68; H01R 25/006
(Continued)

(56) References Cited

U.S. PATENT DOCUMENTS

| 5,183,404 A | 2/1993 | Aldous et al. |
| 5,634,802 A * | 6/1997 | Kerklaan ............... H01R 13/60 439/131 |

(Continued)

FOREIGN PATENT DOCUMENTS

| CN | 201656019 | 11/2010 |
| CN | 102843461 | 12/2012 |

(Continued)

OTHER PUBLICATIONS

"Caseplug—USB Integrated Iphone Case", Retrieved From: <http://prefundia.com/projects/view/caseplug-usb-integrated-iphone-case/2366/> Aug. 11, 2015, Aug. 16, 2014, 23 pages.

(Continued)

*Primary Examiner* — James Harvey
*Assistant Examiner* — Matthew T Dzierzynski

(57) ABSTRACT

Extendable connector ports are described herein that may be implemented in thin computing devices. An extendable connector port includes a floor, tongue, and roof that expand from a closed position stored within a computing device to an open position that extends away from the computing device. An extension mechanism of the extendable connector port maintains a parallel orientation of the floor, tongue, and roof and gaps in the extendable connector port when the port extends to the open position. The extendable connector port may then be collapsed into the closed position by reducing or eliminating gaps between the floor, tongue, and roof, so that the connector port is thinner in its closed position than it is in its open position. This collapsibility of the extendable connector port allows thin computing devices to include ports that are thicker than a housing of the device.

20 Claims, 12 Drawing Sheets

(51) Int. Cl.
*H01R 13/447* (2006.01)
*H01R 13/66* (2006.01)
*H01R 13/73* (2006.01)
*G06F 21/86* (2013.01)
*G06F 21/31* (2013.01)
*G06F 1/16* (2006.01)
*H01R 13/453* (2006.01)
*H01R 13/50* (2006.01)
*H01R 13/74* (2006.01)
*H01R 24/68* (2011.01)
*H01R 12/72* (2011.01)

(52) U.S. Cl.
CPC ....... *H01R 13/4532* (2013.01); *H01R 13/501* (2013.01); *H01R 13/665* (2013.01); *H01R 13/73* (2013.01); *H01R 13/743* (2013.01); *H01R 12/721* (2013.01)

(58) Field of Classification Search
USPC ....... 439/131, 133, 135, 352, 134, 136, 141, 439/142
See application file for complete search history.

(56) References Cited

U.S. PATENT DOCUMENTS

| | | | | |
|---|---|---|---|---|
| 6,141,831 A * | 11/2000 | Novin | ................. | H04M 1/0216 16/303 |
| 6,290,517 B1 * | 9/2001 | Anderson | ............ | G06F 1/1616 439/131 |
| 6,905,351 B1 | 6/2005 | Wang et al. | | |
| 7,097,472 B2 * | 8/2006 | Parker | ................. | H01R 24/62 439/131 |
| 7,344,072 B2 | 3/2008 | Gonzalez et al. | | |
| 7,452,220 B2 | 11/2008 | Reid et al. | | |
| 7,500,861 B2 * | 3/2009 | Harkabi | ................. | H01R 27/00 439/218 |
| 7,572,139 B2 * | 8/2009 | Montena | ............... | H01R 23/10 439/358 |
| 7,677,065 B1 * | 3/2010 | Miao | ..................... | E05B 37/02 439/133 |
| 7,959,449 B2 * | 6/2011 | Tracy | ................... | G06F 1/1656 439/131 |
| 8,113,882 B1 * | 2/2012 | Chen | ................. | H01R 13/6581 439/607.01 |
| 8,348,684 B2 * | 1/2013 | Ladouceur | ......... | H04M 1/0274 439/131 |
| 8,897,005 B2 * | 11/2014 | Huang | .................... | H05K 7/16 361/679.01 |
| 9,083,106 B2 * | 7/2015 | Lin | ...................... | H01R 13/518 |
| 9,130,332 B2 * | 9/2015 | Yosef | .................... | H01R 31/06 |
| 2007/0077797 A1 | 4/2007 | Reid et al. | | |
| 2012/0052704 A1 | 3/2012 | Yen | | |
| 2013/0107465 A1 | 5/2013 | Huang et al. | | |
| 2015/0037990 A1 | 2/2015 | Yu et al. | | |

FOREIGN PATENT DOCUMENTS

| | | |
|---|---|---|
| CN | 202759495 | 2/2013 |
| CN | 202888483 | 4/2013 |
| CN | 203423351 | 2/2014 |
| EP | 0697753 | 2/1996 |

OTHER PUBLICATIONS

"Tag Heuer USB", Retrieved From: <http://christophbehlingdesign.com/work/communication-/tag-heuer-usb-/> Aug. 11, 2015, Oct. 26, 2012, 3 pages.

"PowerCard Slim Micro USB Power Bank Charger", Retrieved From: <http://www.mobilefun.com/40219-powercard-slim-micro-usb-power-bank-charger-400mah.htm> Aug. 11, 2015, Apr. 28, 2014, 3 pages.

"Goodram Gold USB Credit Card", Retrieved From: <http://www.goodram.com/product/usb-2-0-flash-drive/goodram-gold-credit-card/> Aug. 11, 2015, Jun. 3, 2014, 3 pages.

Tanous,"The EMIE Power Blade Portable USB Charger", Retrieved From: <http://www.tekrevue.com/emie-power-blade-portable-usb-charger/> Aug. 11, 2015, Feb. 24, 2015, 11 pages.

"International Search Report and Written Opinion Issued in PCT Application No. PCT/US2016/045450", Mailed Date: Nov. 4, 2016, 12 Pages.

"Second Written Opinion", Application No. PCT/US2016/045450, dated Sep. 12, 2017, 7 pages.

\* cited by examiner

EXTENDABLE CONNECTOR PORT

SUMMARY

Extendable connector ports for computing devices are described herein. In one or more implementations, an extendable connector port is integrated into a surface of a housing of a computing device such that an outer surface of the connector port is flush with the surface of the housing when the connector port is in a closed position. Techniques described herein enable the connector port to extend away from the surface of the housing to an open position where the connector port is disposed outside the housing and capable of receiving a plug of a peripheral device to transmit data and power between the computing device and the peripheral device. The connector port is configured to expand as it extends to the open position so that it may be housed in a portion of the computing device otherwise not thick enough to house the expanded connector port.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
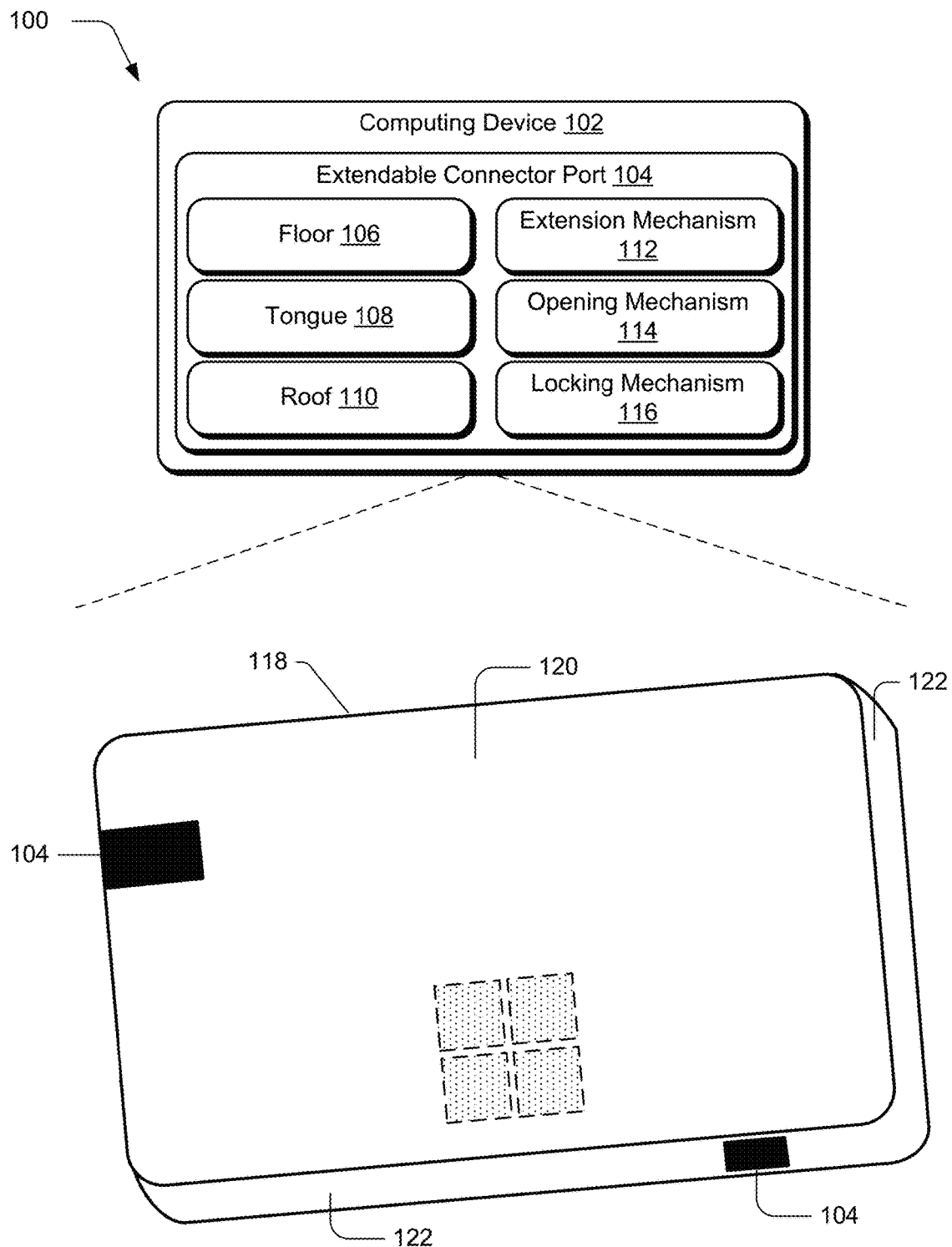
FIG. 1 illustrates an environment that is operable to employ extendable connector ports in accordance with one or more implementations.

As computing devices continue to decrease in size, the available area for ports, jacks, optical drives, and the like similarly decreases. This decrease in available area frequently results in the manufacture of computing devices that include only a minimal number of ports, particularly in today's thin and light mobile computing devices. Conventional ports, however, are not designed with these size constraints in mind and are typically thicker than housings of many modern computing devices. As a result, although these conventional ports are still present in larger computing devices such as desktop computers, they are generally not included in today's mobile computing devices. Despite this lack of connector ports in many modern computing devices, peripheral devices that connect to these ports are still in widespread use. Accordingly, balancing computing device design against compatibility with a wide range of peripheral devices presents a considerable challenge, particularly as computing devices continue to decrease in size.

Extendable connector ports for computing devices are described. In one or more implementations, an extendable connector port is configured to expand as it extends from a closed position to an open position. Components of the connector port are connected to an extension mechanism, which extends the port away from a housing of a computing device. The extension mechanism additionally adjusts gaps between the components as the transitions between open and closed positions. When the connector port is extended and expanded to its open position, the port is of a sufficient size to receive and retain a plug of a peripheral device.

Components of the extendable connector port include a floor, a tongue, and a roof. The floor is configured to retain and shield a plug of a peripheral device from contacting a housing or internal elements of the computing device. The tongue includes one or more contacts for communicating power and data between the computing device and the peripheral device. The roof is configured to retain and shield the plug of the peripheral device and, in some implementations, is configured to enable opening of the connector port.

To provide a uniform appearance, the roof of the connector port may be constructed of a same material as a housing of the computing device. For example, the roof may be configured to match characteristics such as the texture, color, material, and/or patterning of the surface of a housing. In this way, when the connector port is retracted in a closed position, an external surface of the roof generally lies flush with a surface of the computing device, such that a closed connector port appears to be part of the computing device housing. Because gaps between the components of the connector port are configured to shrink or eliminate altogether when the connector port is retracted to a closed position, the connector port may be included in a device that is thinner than a thickness of an open connector port. Thus, the extendable connector port enables a computing device to include ports that are thicker than the computing device without increasing a thickness of the computing device.

In the following discussion, an example environment is first described that may employ the extendable connector ports described herein. Example procedures are then described which may be performed in the example environment as well as other environments. Consequently, performance of the example procedures is not limited to the example environment and the example environment is not limited to performance of the example procedures.

Example Operating Environment

FIG. 1 illustrates an environment 100 in an example implementation that is operable to employ extendable connector ports described herein. The illustrated environment 100 includes a computing device 102 having one or more extendable connector ports 104, although other configurations are also contemplated as further described below.

The computing device 102 may be configured in a variety of ways. For example, a computing device may be configured as a computer that is capable of communicating over a network, such as a desktop computer, a mobile station, a wearable device, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Further discussion of different configurations that may be assumed by the computing device may be found in relation to FIG. 12.

In accordance with principles discussed in this document, the computing device 102 includes an extendable connector port 104 configured to extend from a closed position to an open position to accept and retain a plug. The extendable connector port 104 includes an extension mechanism 112 that is coupled to one or more of a floor 106, a tongue 108, or a roof 110. As discussed in the details section that follows, the roof 110 of the extendable connector port 104 may be configured to lie flush with one or more of a surface 120 or an edge 122 of a housing 118 of the computing device 102 when the extendable connector port is in a closed position. The extension mechanism 112 is configured to adjust one or more of a gap between the floor 106 and the tongue 108 or a gap between the tongue and the roof 110 as the port 104 transitions between a closed position and an open position.

Extension and retraction of the extendable connector port may be initiated through user input at an opening mechanism 114 or through user interaction with one or more of the floor 106, the tongue 108, or roof 110, as described in further detail below. In accordance with one or more implementations, the extendable connector port includes a locking mechanism 116 that restricts when the connector port can be opened from its closed position. The locking mechanism 116 restricts opening of the extendable connector port based on a physical configuration of the computing device. For example, the locking mechanism may restrict opening of the connector port based on whether a kickstand of a tablet computing device is open, whether a screen of a laptop computing device is deployed, and so on. Additionally or alternatively, the locking mechanism 116 may restrict opening of the connector port based on verification of credentials of a user logged into the computing device.

Extendable Connector Port Configuration and Implementation

Figure 2:
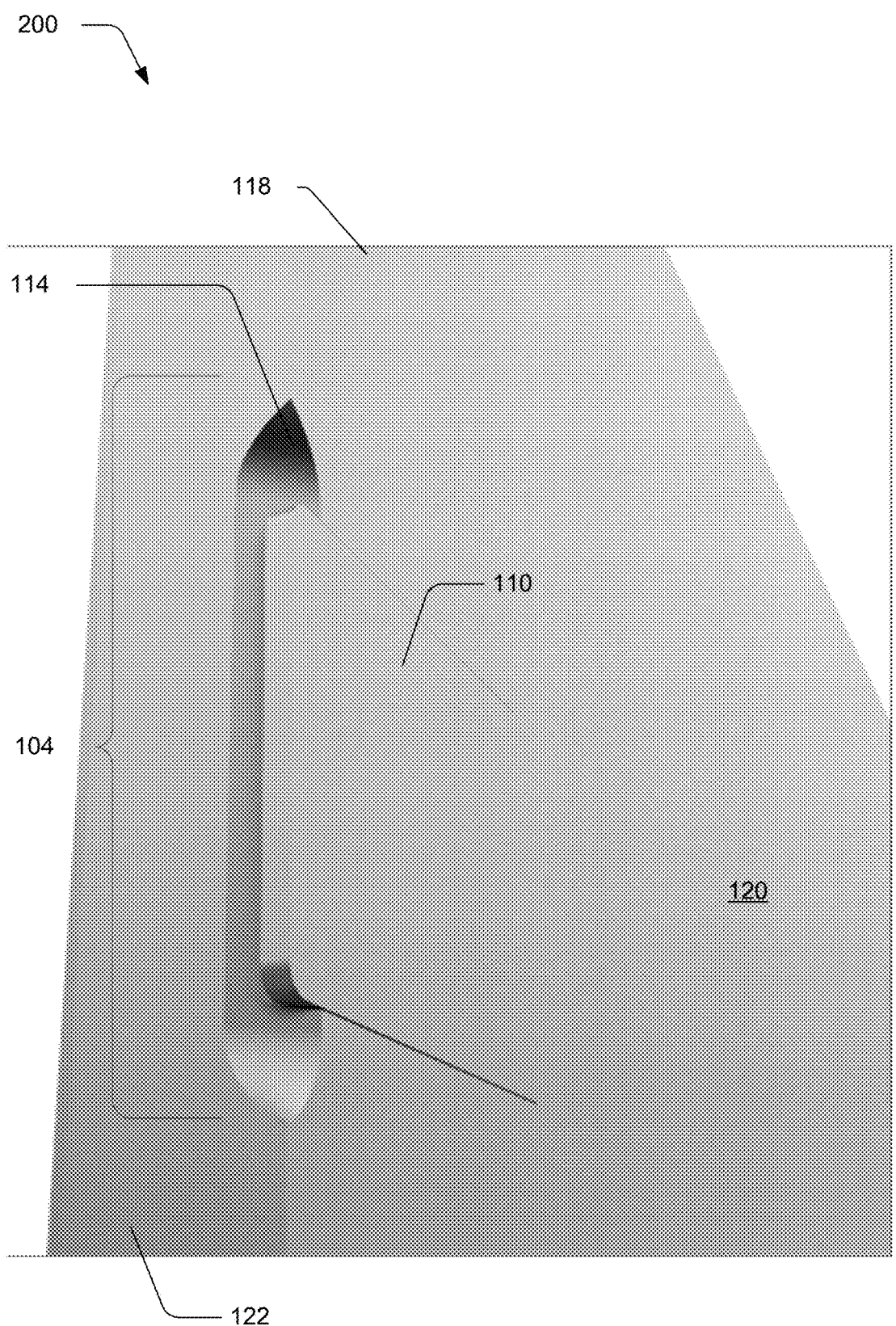
FIG. 2 illustrates an example implementation of a computing device of FIG. 1 that includes an extendable connector port in a closed position in accordance with one or more implementations.

FIG. 2 depicts generally at 200 an example representation of a housing 118 of a computing device that employs an extendable connector port 104 in accordance with one or more implementations. In the example of FIG. 2, the extendable connector port 104 is illustrated in a closed position and disposed on a rear surface 120 of the housing 118. A roof 110 of the extendable connector port 104 is configured to lie flush with one or both of the surface 120 of the housing 118 or an edge 122 of the housing. In this manner, the connector port appears to be part of the housing when it is configured in the closed position. For example, the roof may be configured to match characteristics such as the texture, color, material, and/or patterning of the surface of a housing.

In order to enable opening of the extendable connector port, the computing device 102 includes an opening mechanism 114. Here, the opening mechanism 114 is illustrated as an indentation in the housing 118 that exposes portions of the connector port 104. As illustrated, the indentation 114 is configured to expose a portion of a surface of the roof 110 opposite the surface 120 of the housing 118. By exposing a portion of the roof 110, a user can open the connector port by pulling the roof 110 away from a surface of the housing 118. In one or more implementations, the indentation is configured to receive a user's fingernail or fingertip so that the extendable connector port 104 can be opened with a single finger. Although the indentation is illustrated as extending a width along edge 122 that is longer than a corresponding width of the roof 110, the indentation may extend any distance along the edge 122 to permit opening of the extendable connector port.

Additionally or alternatively, the opening mechanism 114 may be configured as a button, a slider switch, a rocker switch, or the like. In these configurations, the opening mechanism 114 may be disposed on an edge 122 or surface 120 of the housing 118. In response to receiving input at the opening mechanism 114, the opening mechanism triggers a latch disposed inside the housing 118 of the computing device to release the extendable connector 104 port from its closed position. Upon triggering of the latch, the connector port 104 is configured to extend automatically to an open position without additional user interaction. Alternatively, the connector port is configured to partially extend to the open position responsive to triggering of the latch, enabling a user to pull the roof 110 away from the housing 118 and fully extend the connector port to its open position. An example open position of the extendable connector port may be configured as discussed with respect to FIG. 3.

Figure 3:
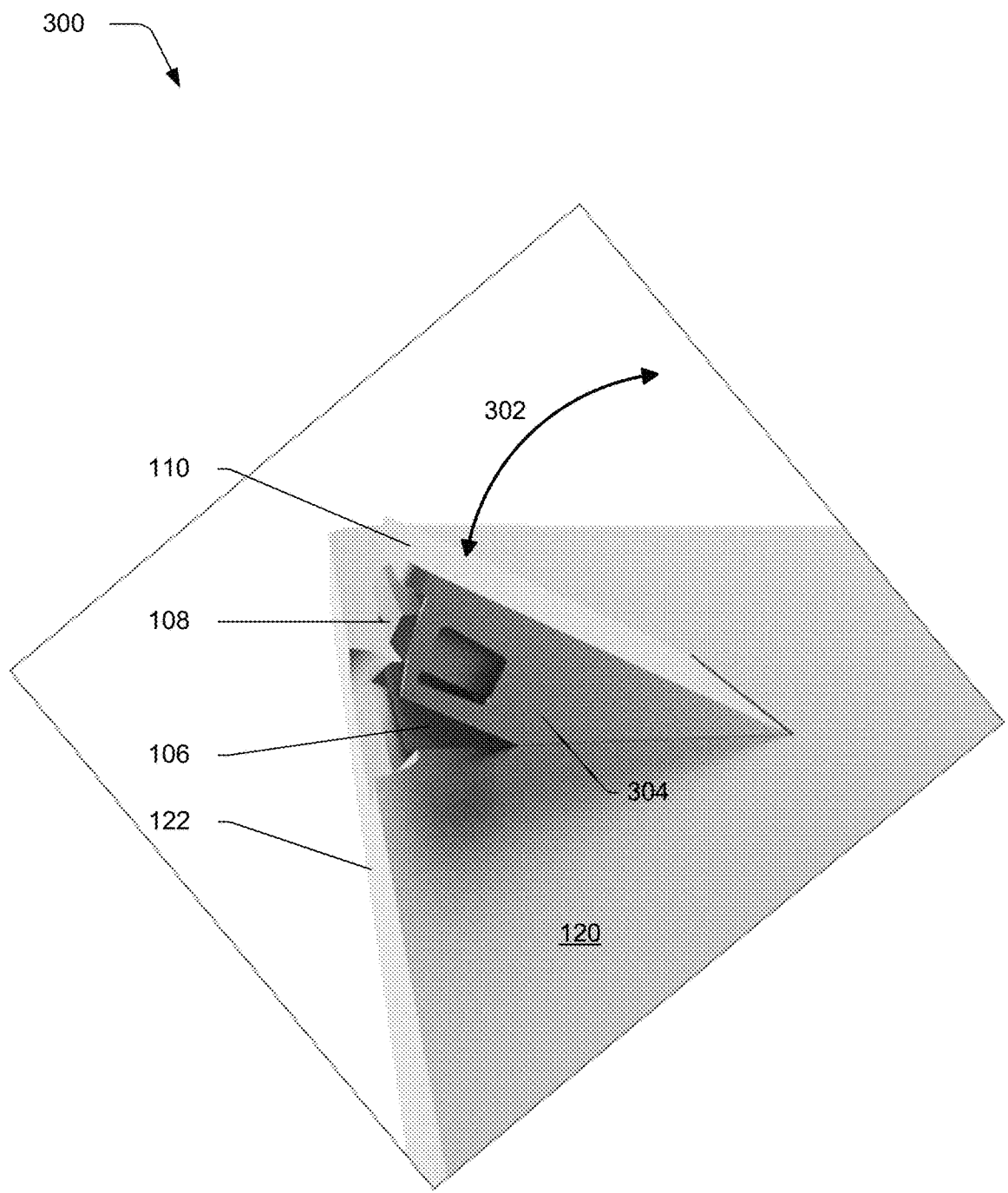
FIG. 3 illustrates an example extendable connector port in an open position in accordance with one or more implementations.

FIG. 3 illustrates at 300 an example of a computing device with an open extendable connector port in accordance with one or more implementations. Here, the connector port is configured to extend rotationally away from a surface 120 of a housing of the computing device. The connector port extends generally along the path 302 from a closed position as illustrated in FIG. 2 to the open position that is angled away from the housing of the computing device as illustrated in FIG. 3. In one or more implementations, an edge of the roof that is flush with the edge of the computing device 122 when the connector port is in the closed position is configured to extend rotationally away from the surface 120 of the housing. An opposite end of the roof is hinged inside the housing to expose a floor 106 and a tongue 108 when the connector port is in the open position.

When the connector port is in the open position, the floor 106 and the tongue 108 are exposed to receive a plug of a peripheral device to be attached to the computing device. In order to protect the plug of the peripheral device from contacting internal components of the computing device and potentially damaging either device, the floor 106 acts as a shield to separate the peripheral device plug from the computing device. For additional protection, the roof 110 may include sidewalls 304 that are disposed on opposite edges of the roof and that extend toward the floor 106. The sidewalls 304 operate to protect the tongue 108 and guide a peripheral device plug for insertion into the connector port.

In an alternative implementation, the connector port extends rotationally away from the housing along a path perpendicular to path 302. The connector port also includes one or more stops configured to stabilize the port after any one or more predesignated angles. For example, the connector port may include one or more stops configured to stabilize the port after 45, 90, or 180 degrees of rotation. For example, a connector port hinged adjacent to edge 122 would open orthogonal to surface 120 at 90 degrees rotation and open orthogonal to edge 122 at 180 degrees rotation. There, one or more of the floor 106, tongue 108, or roof 110 separate from one another to expand the extended port in accordance with any of the techniques described herein. An example peripheral device plug connected to an extendable connector port in accordance with one or more implementations is discussed with respect to FIG. 4.

Figure 4:
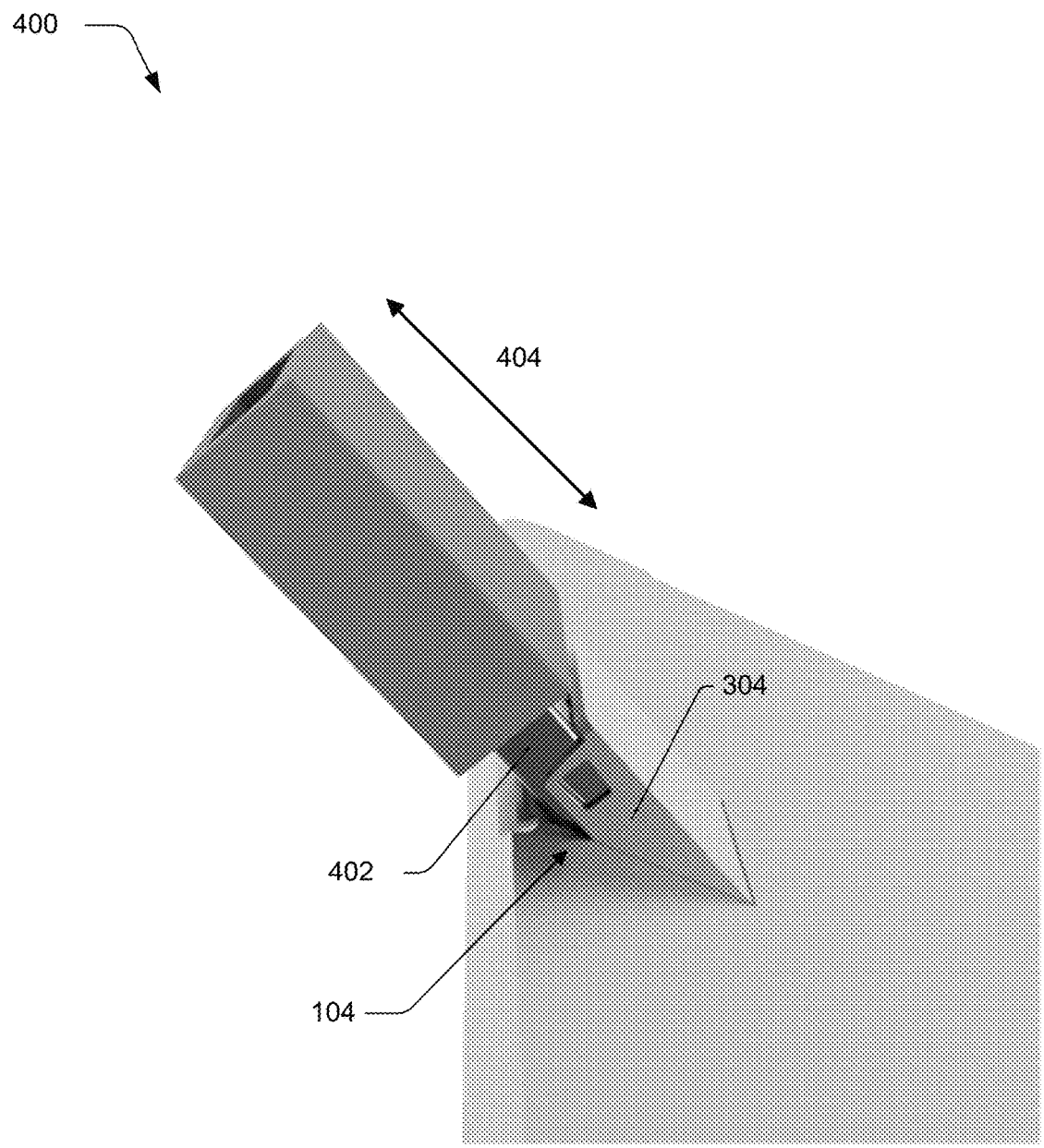
FIG. 4 illustrates an example implementation of a plug connected to an extendable connector port in accordance with one or more implementations.

FIG. 4 illustrates at 400 a side view of an example peripheral device connected to an extendable connector port in accordance with one or more implementations. Here, the peripheral device includes a plug 402 configured to attach to and detach from the connector port 104 generally along an axis 404. The connector port 104 may be configured to open to expose gaps between the tongue, the roof, and the floor that correspond in size to protrusions of the plug 402.

By precisely configuring the connector port 104 to open and expose a first gap between the floor and the tongue at a first distance and expose a second gap between the tongue and the roof at a second distance, the connector port retains the plug 402 with a force fit against the roof and the floor. For example, connector port 104 may be configured as a Standard-A USB receptacle configured to receive a Standard-A USB plug.

Return will now be made again to FIG. 3, in accordance with this standard, connector port 104 is configured to extend away from computing device to accept a Standard-A USB plug when the connector port is in an open position. For example, an open position of connector port 104 may be configured so that the edge of the roof 110 corresponding to the edge 122 of the housing extends at least 4.5 millimeters away from the floor 106. A gap between the floor 106 and the tongue 108 is configured to expand to a first distance of approximately 1.95 millimeters. A gap between the roof 110 and the tongue 108 is configured to expand to a second distance of approximately 0.315 millimeters. Similarly, sidewalls 304 may be spaced approximately 0.315 millimeters from parallel sides of the tongue 108. Although the connector port 104 is discussed as corresponding to a Standard-A USB receptacle, the connector port 104 may be configured as any port, such as a SATA port, an HDMI port, a Standard-C USB port, a power adapter port, and so on.

Returning to FIG. 4, these gaps of the connector port 104 are configured to guide and retain corresponding protrusions of plug 402 of an attached peripheral device. Sidewalls 304 are configured to protect the tongue from damage that otherwise might be caused by lateral or torsional forces caused by a user bumping into or twisting the attached plug 402. The sidewalls 304 may also prevent off-axis removal of the plug 402.

For example, the sidewalls, floor, and roof of the connector port 104 may be configured to retain an attached plug 402 unless force is applied to the attached plug within a threshold angle of axis 404. This threshold angle may be configured to retain an attached plug when it is incidentally bumped during contact but allow for easy removal when pulled away from the computing device. Additionally, the tongue may be configured to deform flexibly to protect itself against damaging forces applied to the plug 402. Accordingly, the connector port allows easy insertion and removal of a plug along a specified axis while retaining the plug under off-axis forces. When the plug 402 is removed from the connector port 104, the port is retracted so that a surface of the roof again lies flush with the housing.

Figure 5:
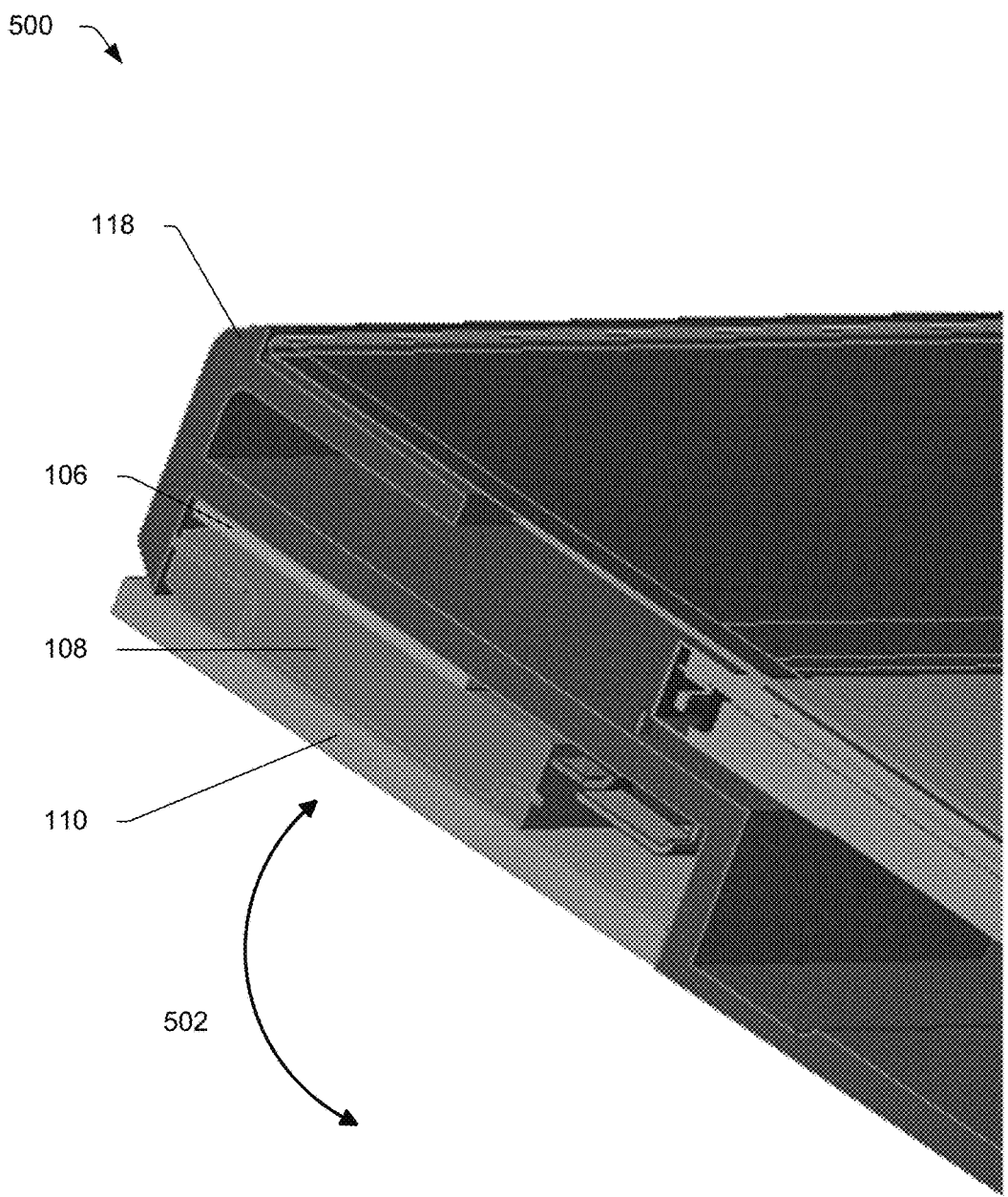
FIG. 5 illustrates an example cutaway view of a housing of a computing device that includes an extendable connector port in a closed position in accordance with one or more implementations.

FIG. 5 illustrates at 500 an example cutaway view of a housing of a computing device that includes an extendable connector port in a closed position in accordance with one or more implementations. Continuing the rotational extension example discussed with respect to previous figures, the extendable connector port illustrated in FIG. 5 is configured to extend away from and retract into the housing 118 of a computing device generally along path 502. As illustrated in the closed position, gaps between floor 106, the tongue 108, and the roof 110 may be reduced or eliminated. For example, in a closed position the floor 106 may contact both the housing 118 and the tongue 108 and the tongue 108 may contact both the floor 106 and the roof 110.

Accordingly, a housing 118 in accordance with one or more implementations can be designed to internally house a thickness of the floor 106 and the tongue 108. Additional storage space within the housing is not necessary for the roof 110 because the roof is configured to lie flush with the housing. This enables a housing 118 to accommodate an extendable connector port that expands to an open position where the connector port is thicker than half of an overall thickness of the housing. For example, a computing device may have a housing 118 that is less than nine millimeters. Such a device would generally be unable to accommodate conventional port sizes of 4.5 millimeters or greater without implementing extendable connector ports described herein. As described in further detail with respect to FIGS. 6-10 below, an extendable connector port may be configured to extend away from a housing of a computing device in a variety of manners.

Figure 6:
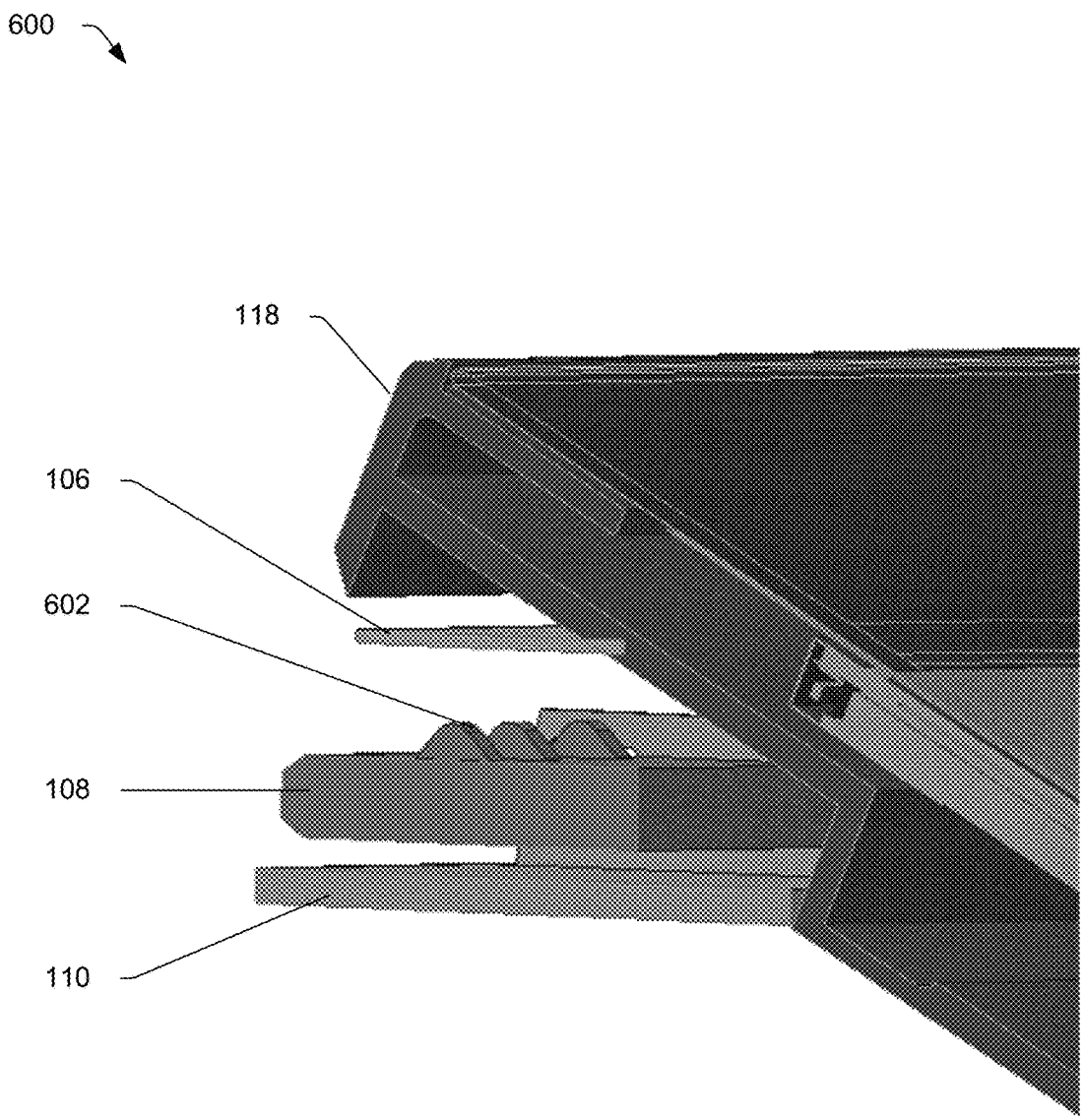
FIG. 6 illustrates an example cutaway view of a housing of a computing device that includes an extendable connector port in an open position in accordance with one or more implementations.

FIG. 6 illustrates at 600 an example cutaway view of a housing of a computing device that includes an extendable connector port in an open position in accordance with one or more implementations. Here, the connector port is configured to extend rotationally away from a housing 118 of the computing device generally along a path 502 as illustrated in FIG. 5. Returning to the cutaway view of FIG. 6, the connector port includes a floor 106, a tongue 108, and a roof 110 that are separated by gaps to receive and retain a plug attached to the connector port.

The tongue 108 includes one or more contacts 602 that are configured to transmit one or both of data and power between the computing device and a peripheral device attached to the open connector port. Although the contacts 602 are illustrated on a single side of the tongue 108, the contacts may be disposed on any one or more surfaces of the tongue. For example, when the connector port is configured in a Standard-A USB configuration, the tongue 108 includes four contacts that are configured to transmit power and data between the computing device and an attached USB device.

The floor 106 and the roof 110 may each include one or more retaining pins disposed on a surface to retain a plug of a peripheral device attached to the connector port. For example, the floor 106 may include one or more retaining pins on a surface of the floor facing the tongue 108 that are configured to mate with one or more corresponding cavities in an attached plug. Alternatively, the one or more retaining pins may be configured to apply a force fit against a surface of an attached plug that does not include any corresponding cavities.

Likewise, the roof 110 may include one or more retaining pins on a surface of the roof facing the tongue 108. The retaining pins may be configured to mate with one or more corresponding cavities in an attached plug or may apply a force fit against a surface of the attached plug.

These retaining pins of one or both of the floor 106 and roof 110 may be configured to deform flexibly so that surfaces of the floor, tongue, and roof lie flat against one another when in a closed position, such as the closed position illustrated in FIG. 5. This flexible deformation of the retaining pins enables an extendable connector port to restrict an attached plug from falling out or otherwise disconnecting from the computing device. The retaining pins may be configured to permit removal of an attached plug along an axis 402 as illustrated in FIG. 4. Accordingly, the connector port can retain an attached plug when off-axis forces are applied. For example, a connector port may be configured to restrict removal of an attached plug when force is applied to the plug at an angle greater than a threshold angle from axis 402.

Returning to the rotational extension example illustrated in FIG. 5, the floor 106, tongue 108 and roof 110 may be hinged at the housing 118 to rotate about different axes. By configuring these components to rotate about different axes, the floor, tongue, and roof maintain a parallel orientation, one to another, independent of a position of the connector port.

In one or more implementations, a connector port may be configured to extend rotationally away from a computing device using a friction hinge that maintains a position of the connector port. In this friction hinge configuration, the connector port remains stable in both a closed position and an open position. Using the example illustrated in FIG. 2, an opening mechanism 114 may be configured as an indentation that exposes a portion of a surface of a roof 110 of the connector port opposite the surface of the housing such that a user can open the connector port with a finger. In this manner, a user may open a friction hinge of the connector port by pulling the roof 110 away from the housing 118 to extend the connector port to an open position.

Returning to FIG. 6, in one or more implementations a connector port may be configured to extend rotationally away from a housing 118 of a computing device using a spring-loaded hinge. The spring-loaded hinge may be configured as a bi-stable friction hinge, such that the connector port remains stable when positioned in a closed position and remains stable when positioned in an open position. In this configuration, the roof 110 may be attached to a hinge spring disposed within the housing. Alternatively or additionally, the roof 110 itself may be configured as a spring that provides the force to open the connector port from the closed position to the open position. In such a configuration, the connector port may be configured to remain stable in both open and closed positions.

In one or more implementations, a connector port may be restricted from opening by a latch disposed within the housing 118. The connector port may be coupled to a spring that forces the connector port to expand to an open position when the latch is released. The latch may be triggered by interaction with an opening mechanism, such as opening mechanism 114 of FIG. 1.

An opening mechanism may be configured to trigger a latch to release the roof 110. Alternatively or additionally, the opening mechanism may be configured as a slider switch, a rocker switch, or the like. Furthermore, the opening mechanism may be implemented in one or more program modules of a computing device, and configured to trigger a latch to release the connector port in response to receiving input at one or more input interfaces coupled to the computing device. In implementations where the connector port is restricted by a latch within the housing 118, the floor 106, tongue 108, and roof 110 may be coupled to a spring that forces the connector port to expand from a closed position to an open position upon triggering of the latch, as discussed in greater detail below.

In accordance with one or more implementations, a connector port may be restricted from opening from a closed position by a locking mechanism disposed within the computing device. For example, the connector port may include a locking mechanism 116, as illustrated in FIG. 1, which restricts when the connector port can be opened from its closed position. The locking mechanism 116 may restrict opening of the extendable connector port based on a physical configuration of the computing device, such as whether a kickstand of a tablet computing device is deployed, whether a screen of a laptop computing device is open, and so on.

Additionally or alternatively, the locking mechanism 116 may restrict opening of the extendable connector port based on verification of credentials of a user logged into the computing device. In addition to the implementations described above where an extendable connector port is configured to extend at an angle away from a surface of a computing device, an extendable connector port may be configured to extend orthogonally away from a surface of a computing device.

Figure 7:
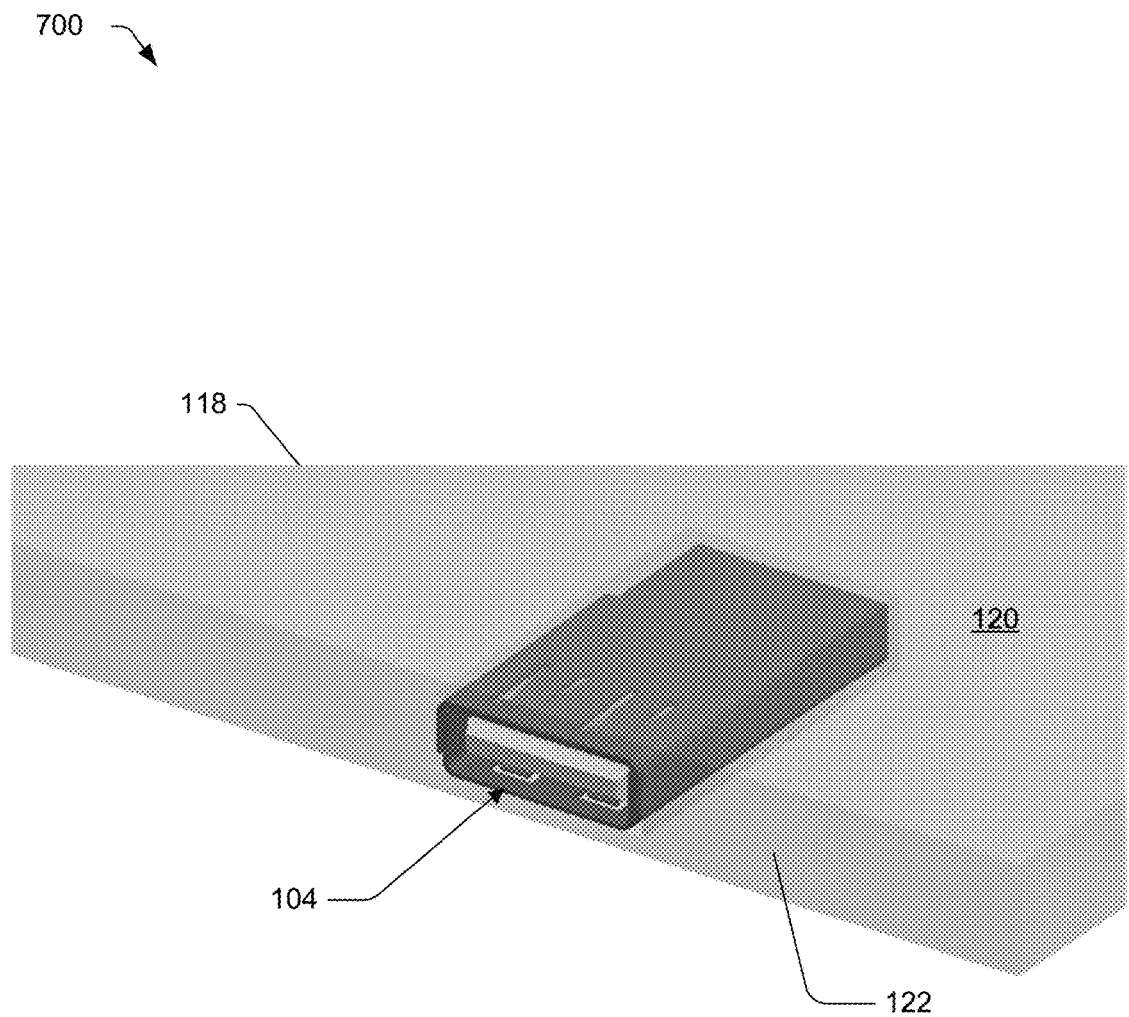
FIG. 7 illustrates an example extendable connector port in a closed position in accordance with one or more implementations.

FIG. 7 illustrates generally at 700 an example view of a housing 118 of a computing device that employs an extendable connector port 104 in accordance with one or more implementations. In the illustrated example of FIG. 7, the connector port is illustrated in a closed position. From this closed position, the connector port is configured to extend orthogonally from a surface of edge 122 of the housing. As illustrated, an edge of the connector port that is parallel with edge 122 of the housing 118 may be exposed when the connector port 104 is in the closed position. Alternatively, one of the connector port 104 or the housing 118 may include a flap configured to lie flush with the surface of edge 122 to cover the connector port when it is in a closed position. For example, the flap may be configured to match characteristics such as the texture, color, material, and/or patterning of the surface of the housing.

Although the example in FIG. 7 depicts a connector port 104 configured to extend away from the edge 122 of the surface of the housing 118, the connector port may be configured to extend from any edge of the surface of the housing. Similarly, although only one extendable connector port is illustrated, a computing device may include any number of connector ports disposed on one or more edges 122 or on a surface 120 of a housing, as depicted in FIG. 1. A computing device may include any one or a combination of rotationally extendable connector ports, such as the examples discussed above, or orthogonally extendable connector ports as is described in further detail with respect to FIGS. 8 and 9.

Figure 8:
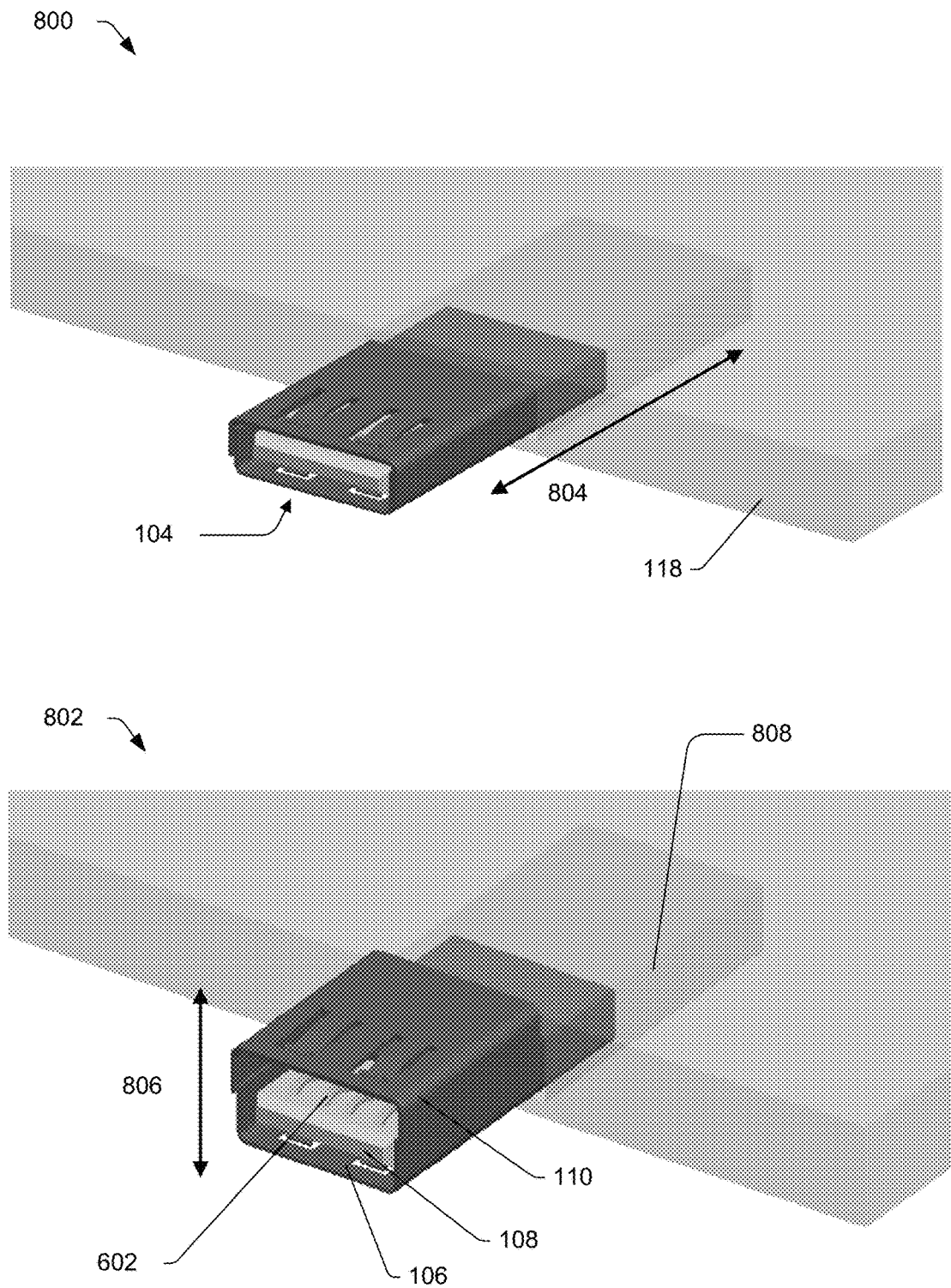
FIG. 8 illustrates example views of an extendable connector port extending to an open position in accordance with one or more implementations.

FIG. 8 at 800 and 802 illustrates generally an example view of an extendable connector port 104 expanding from the closed position depicted in FIG. 7 to an open position at 802. Here, the connector port is configured to extend orthogonally away from a surface of a housing of a computing device to receive a plug of a peripheral device. The connector port 104 is configured to first extend generally along a first axis 804 until a roof 110 of the connector port is clear of the housing 118. Once the roof 110 has cleared the housing 118, the connector port is configured to expand generally along a second axis 806 that is generally perpendicular to the first axis 804 until the connector port is expanded to its open position.

As the connector port expands to its open position, one or more gaps between the floor 106, the tongue 108, or the roof 110 similarly expand. For example, when the connector port 104 is in a closed position, the floor 106 may contact both the housing 118 and the tongue 108. Likewise, in the closed position the tongue 108 may contact both the floor 106 and the roof 110. Alternatively, in one or more implementations a gap between the floor 106 and the tongue 108 may be set at a fixed distance while a gap between the tongue 108 and the roof 110 may be configured to change along the second axis 806. In these implementations, the roof 110 separates from the tongue 108 to expose one or more contacts 602 disposed thereon.

The one or more contacts 602 may be configured to transmit one or both of data and power between the computing device and a peripheral device attached to the connector port. For example, the extendable connector port 104 may be configured to expand to a Standard-A USB receptacle size. In this configuration, the floor 106 and the roof 110 may each include one or more retaining pins. As discussed, the one or more retaining pins are configured to retain a plug of a peripheral device attached to the connector port. For example, the floor 106 may include one or more retaining pins on a surface of the floor facing the tongue 108 that are configured to mate with one or more corresponding cavities in an attached plug. Alternatively, the one or more retaining pins may be configured to apply a force fit against one or more surfaces of an attached plug. Additionally or alternatively, the roof 110 may include one or more retaining pins on a surface of the roof facing the tongue 108 that operate in a same manner as the retaining pins of the floor 106.

These retaining pins may be configured to deform flexibly so that surfaces of the floor, tongue, and roof lie flat against one another when the connector port is in a closed position. In one or more implementations, the roof 110 may include one or more openings that allow the one or more contacts 602 to pass through the roof In this manner, a surface of the roof facing the tongue touches a surface of the tongue supporting the one or more contacts when the extendable connector port 104 is in a closed position.

The extendable connector port 104 may be configured to extend orthogonally from a surface of the housing to an open position using a variety of extension mechanisms. For example, an extension mechanism such as extension mechanism 114 illustrated in FIG. 1 may comprise any one or combination of one or more slides, one or more springs, one or more hinges, one or more cam followers, and so on. An example extension mechanism for an orthogonally extendable connector port is illustrated in FIG. 9.

Figure 9:
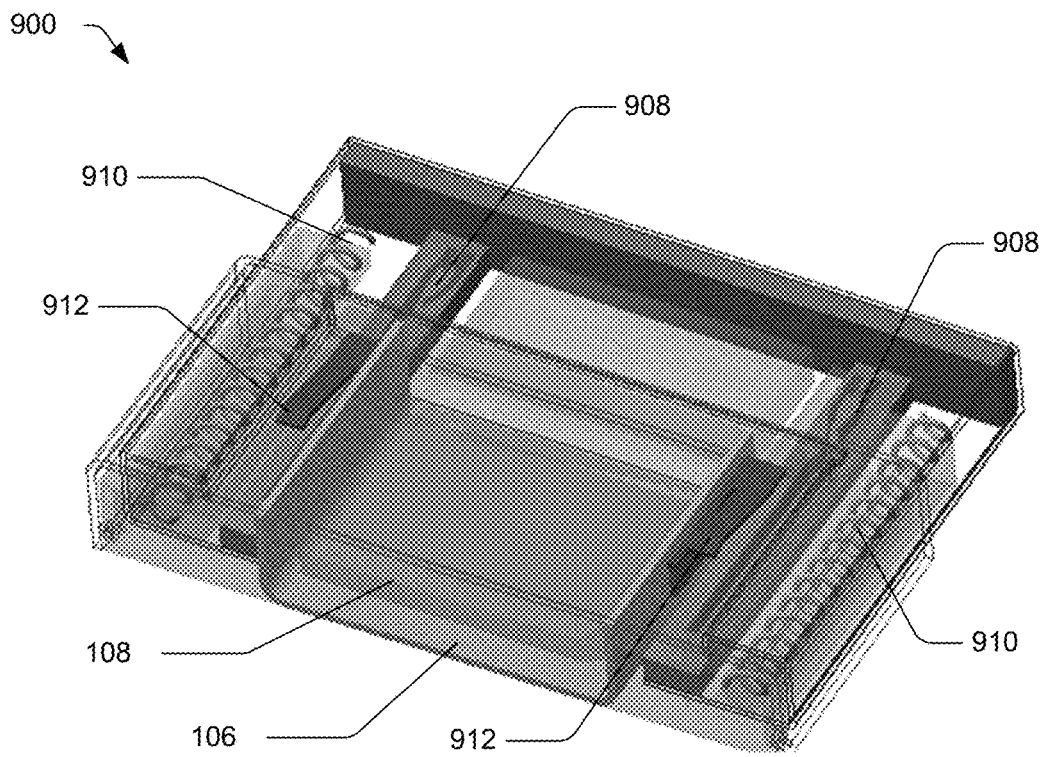
FIG. 9 illustrates example views of an extendable connector port extending to an open position in accordance with one or more implementations.
Figure 9:
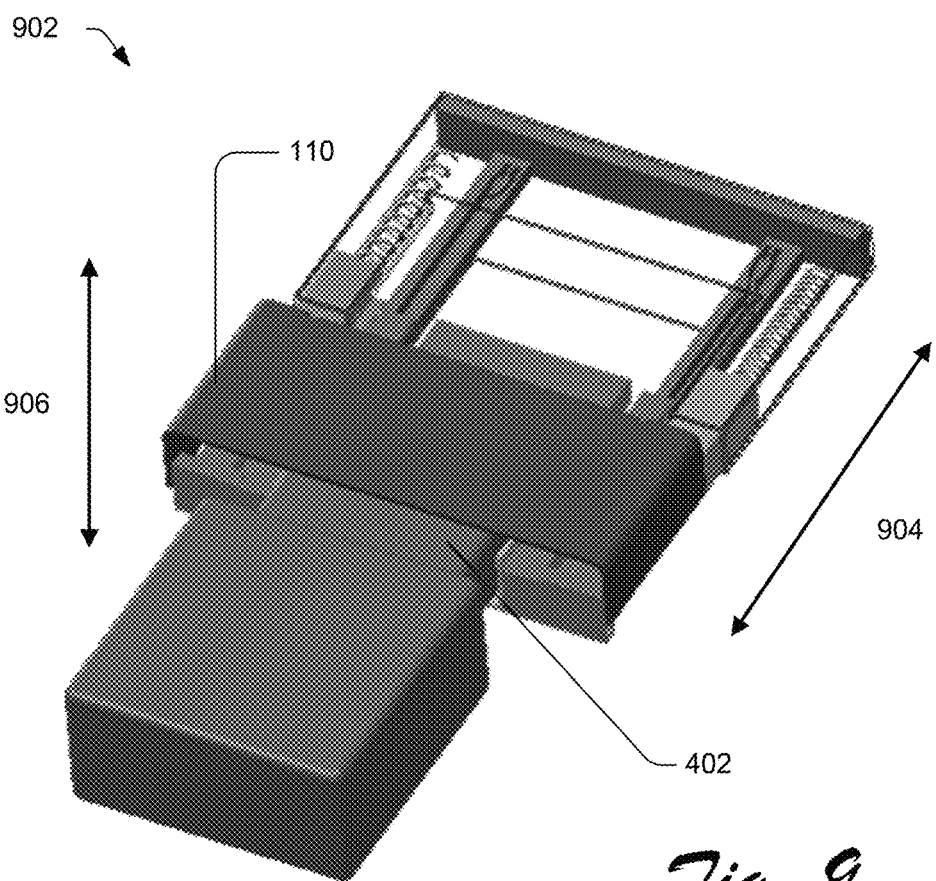

FIG. 9 illustrates generally an example view of an extendable connector port expanding from the closed position at 900 to an open position at 902. Here, the connector port is configured to extend orthogonally away from a surface of a housing of a computing device to receive a plug of a peripheral device. The connector port is configured to first extend generally along a first axis 904 until a roof 110 of the connector port is clear of a computing device housing. Once the roof 110 has cleared the housing, the connector port is configured to expand generally along a second axis 906 that is generally perpendicular to the first axis 904 until the connector port is expanded to its open position. In the open position, the connector port expands to receive a plug 402 of a peripheral device.

The connector port of FIG. 9 transitions between its closed and open positions through use of an extension mechanism that includes guides 908, springs 910, and leaf springs 912. Guides 908 are configured to guide the connector port along axis 904 and may be configured as tracks, rails mounted on bushings, lubricated surfaces, linear slides, and so on.

Although FIG. 9 illustrates a configuration of two guides 908, an extension mechanism may include any number of one or more guides. These guides may be coupled to a computing device housing that stores the connector port when in a closed position or may be integrated into a structural design of the housing. A floor 106 of the connector port may be configured to run along guides 908. For example, the floor 106 may include one or more protrusions configured to run along tracks of the guides 908.

The guides 908 are configured to allow a connector port to extend away from a surface of a housing until a roof 110 of the connector port is clear of the housing. In one or more implementations, an extension mechanism may include one or more springs 910 that are attached to a floor 106 of a connector port and extend the connector port away from the housing. For example, the connector port 104 may be retained by a latch in a closed position such as the position illustrated at 900. When the latch is released, the one or more springs 910 are configured to force the connector port away from the housing generally along axis 904.

In one or more implementations, the one or more springs 910 may extend the connector port away from the housing until a roof 110 clears the housing. Alternatively, the one or more springs 910 may only extend the connector port partially away from the housing along axis 904, enabling a user to pull the connector port away from the housing until the roof 110 is clear.

The one or more leaf springs 912 may be attached to one or both of the floor 106 or the roof 110. Once the roof 110 is clear of the housing, the one or more leaf springs 912 may cause the roof to extend away from the tongue 108 along an axis 906 that is generally perpendicular to axis 904. In this example, the extendable connector port may be retracted by compressing the roof 110 towards the floor 106 generally along axis 906 until the connector port is thin enough to slide back into the housing. When the connector port is thin enough to slide back into the housing, the port may be inserted into the housing along axis 904 until the latch is triggered to retain the port in its closed position. Although described as leaf springs, any type of spring may be used to separate the roof from the floor when the roof is clear of the housing.

Alternatively, guides 908 may be configured as one or more cam follower tracks. In these implementations, the roof 110, tongue 108, and floor 106 are connected to a track that extends the connector port along an axis 904 until the roof 110 is clear of the housing. Once clear, a cam is configured to contact a follower to force the roof away from the tongue and/or floor to create a gap sufficient to receive a plug 402 of a peripheral device as discussed herein.

In implementations where the guides 908 are configured as one or more cam follower tracks, a motor may be used in place of the springs 910 and leaf springs 912. In these implementations, a motor disposed within the computing device may be configured to control one or more cams that cause the connector port to travel along axis 904 and expand along axis 906 when a roof of the connector port clears a housing of the computing device.

To open a connector port, an opening mechanism may be disposed on a surface or edge of a computing device housing, such as opening mechanism 114 illustrated in FIG. 1. As discussed above, the opening mechanism 114 may be configured as a button, a slider switch, a rocker switch, or the like. In response to receiving input at the opening mechanism, the opening mechanism may trigger a latch disposed inside the housing 118 of the computing device to release the connector port from its closed position. Upon triggering of the latch, the extendable connector port 104 may be configured to extend automatically to an open position without additional user interaction.

Alternatively or additionally, an opening mechanism may be disposed on the connector port opposite an opening in the housing 118 through which the port extends to enable a push opening. For example, the opening mechanism may trigger release of a latch restraining the connector port in a closed position in response to a push on the tongue 108. Using the example illustrated in FIG. 8, the connector port may be pushed into the housing 118 generally along axis 804 until the latch is released. Once the latch is released, the opening mechanism may cause the connector port to extend and expand generally along axes 804 and 806 to an open position.

To close the connector port, the port may be retracted by compressing the roof 110 against the floor 106 generally along an axis 806 until the port is thin enough to slide back into the housing 118. Once the connector port is thin enough to slide back into the housing, the port may be inserted into the housing along axis 804 until the latch is triggered to restrict the port in its closed position.

Continuing with the example of FIG. 8, in one or more of the implementations the connector port 104 may be stored in shell 808 disposed within the housing 118. The shell 808 acts as a shield to protect internal components of the computing device from contacting or shorting out any of the one or more contacts 602 disposed on the tongue 108. The shell 808 additionally restricts the connector port 104 from being pushed too far into the housing. In implementations where the housing includes shell 808, the connector port may be configured without a roof 110 to include only the floor 106 and tongue 108.

The contacts 602 of the tongue 108 may be communicatively coupled to a connector that provides a service loop between the connector port 104 and a main bus of the computing device 102. In one or more implementations, this connector may be activated based on a mechanical configuration of the connector port. For example, a connection between the connector port and the computing device may disconnect when the connector port is in a closed position. Conversely, the connection may activate when the connector port expands to its open position. This variable connection provides additional protections for circuitry of the connector port and the computing device. Additionally, the floor 106 and the roof 110 may be insulated with a dielectric to prevent shorting of the one or more contacts 602.

The shell 808 may include one or more stops to restrict the connector port 104 from extending away from the housing 118 beyond one or more distances along axis 804. For example, shell 808 may include a protrusion that stops the connector port from further extending along axis 804 when the roof 110 is clear of the housing, such that a portion of the floor 106 and tongue 108 remain within the shell. Alternatively, the connector port 104 may be configured to come free from the housing 118.

Figure 10:
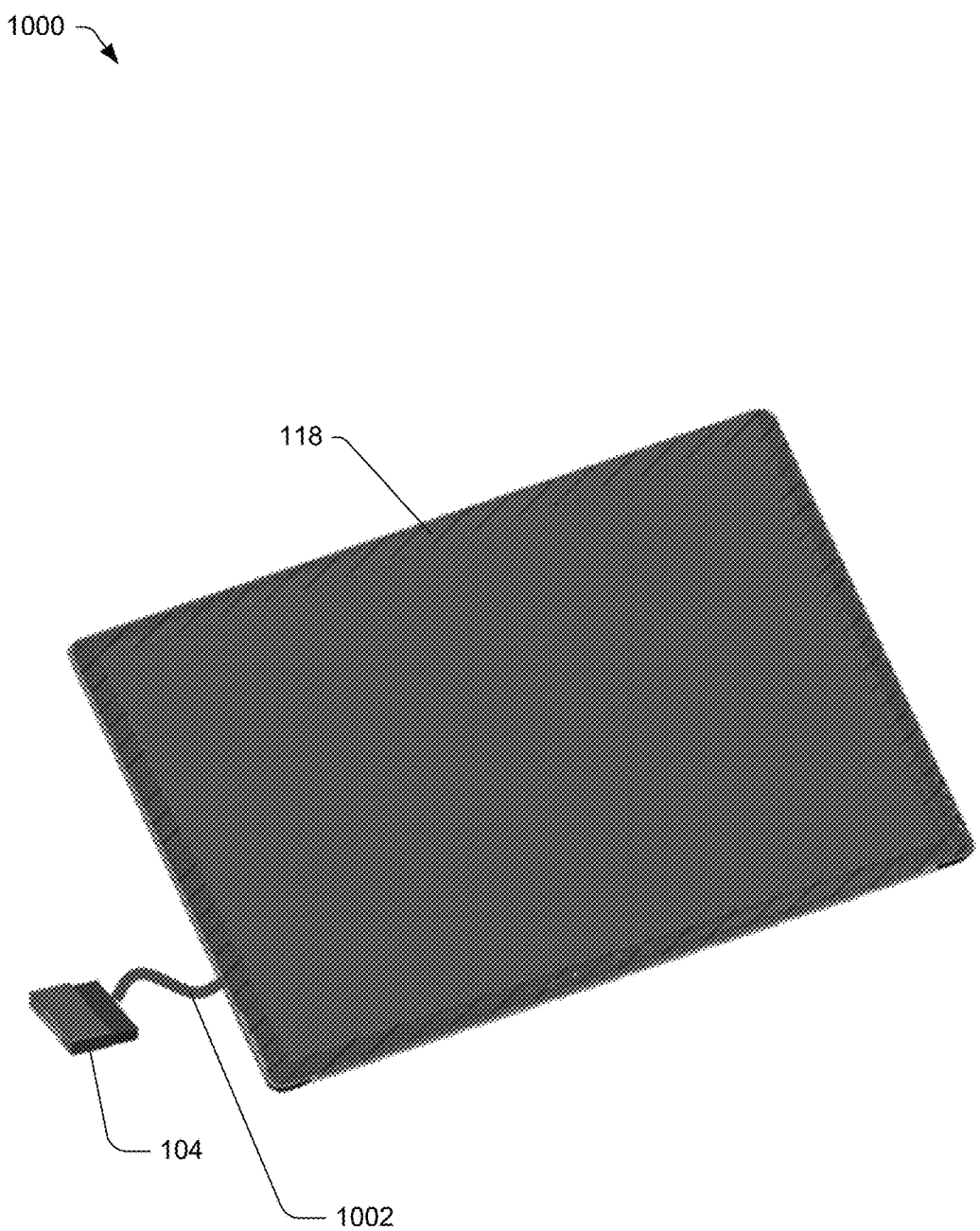
FIG. 10 illustrates an example extendable connector port in an open position in accordance with one or more implementations.

FIG. 10 illustrates at 1000 an example configuration of a connector port that is configured to come free from a computing device housing. In one or more implementations, the connector port 104 may extend away from a housing 118 until the housing no longer encompasses the connector port. In these implementations, the connector port is secured by a tether 1002 that anchors the port to the computing device. This tether 1002 may be configured to transmit one or both of power or data between the connector port and the computing device. The tether 1002 may be configured as any sort of connector configured to transmit one or both of data and power, such as a coaxial cable, a flexible printed circuit, and so on. In tether implementation, individual components of the connector port may be configured to expand away from one another in accordance with any of the techniques discussed herein.

Figure 11:
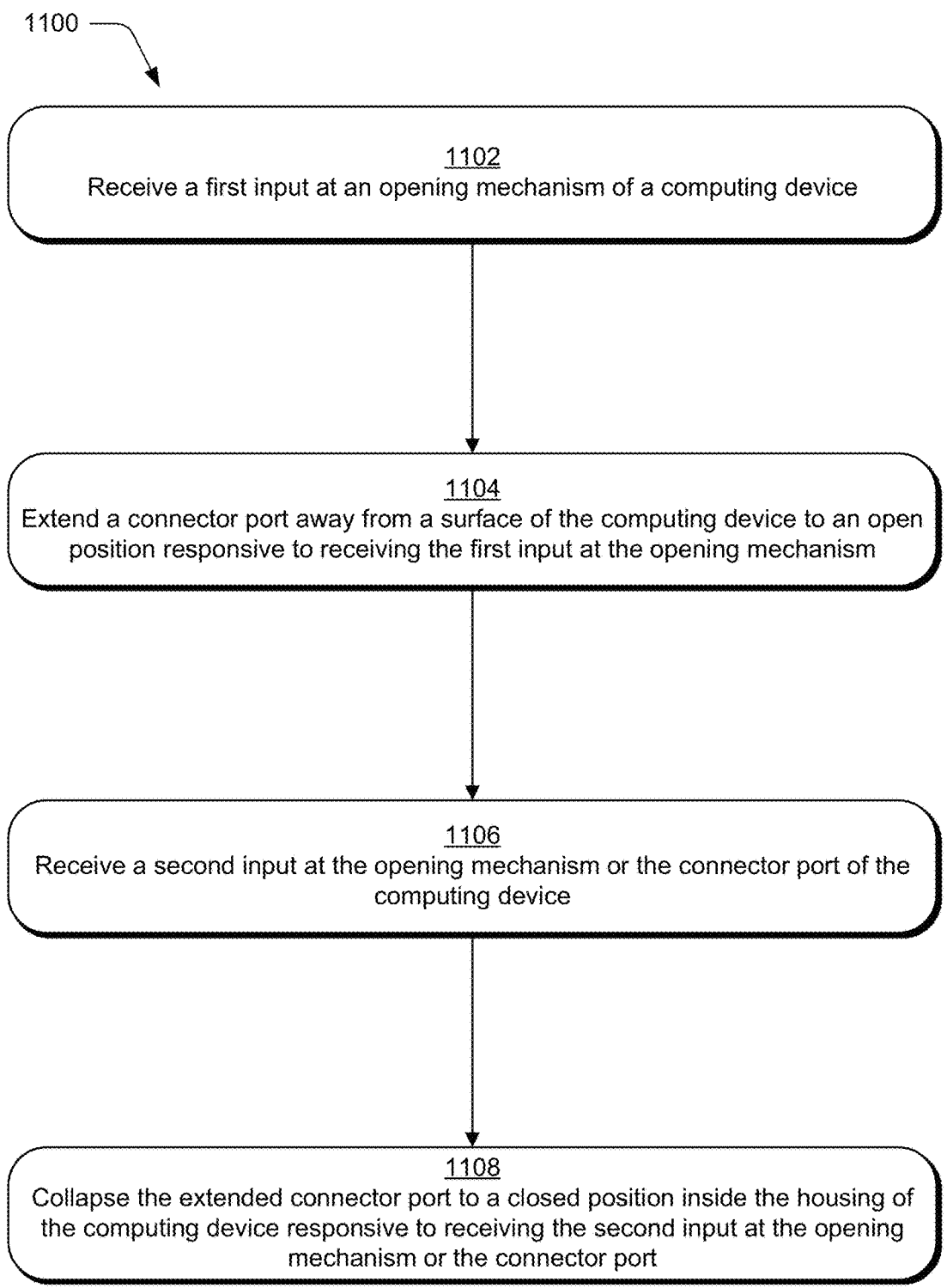
FIG. 11 illustrates an example procedure for extending and retracting an extendable connector port in accordance with one or more implementations.

FIG. 11 illustrates an example procedure 1100 for extending and retracting an extendable connector port in accordance with one or more implementations. The following discussion describes techniques that may be used to extend and retract an extendable connector port of a computing device as described in this document. The procedure is shown as a set of blocks that specify operations performed by one or more devices and are not necessarily limited to the orders shown for performing the operations by the respective blocks. In portions of the following discussion, references may be made to the operating environment 100 of FIG. 1 and the example details of FIGS. 2 through 10, respectively.

A first input is received at an opening mechanism of a computing device (block 1102). For example, computing device 102 may be configured to include an opening mechanism 114. As discussed, the opening mechanism may be disposed on any one or more edges 122 or rear surfaces 120 of a housing 118 of the computing device.

In some examples, the opening mechanism comprises an indentation formed on a surface of the housing 118 configured to receive a fingertip or a fingernail. Alternatively or additionally, the opening mechanism may be configured as a button or a slide disposed on an edge or a surface of the housing, or integrated into program modules disposed within the housing of the computing device.

In response to receiving the first input at the opening mechanism of the computing device, a connector port is extended away from a surface of the computing device to an open position (block 1104). For example, computing device 102 may be configured to include an extendable connector port 104 that is disposed on a surface of a housing 118 of the computing device. As discussed, an extension mechanism 116 of the connector port may be configured to extend rotationally or orthogonally away from a surface of the housing to expand to an open position.

In one or more examples, components of the extendable connector port 104 may distance themselves, one from another, while the connector port is extending to the open position. As discussed, the components may include a floor 106, a tongue 108, and a roof 110 that expand to create or increase gaps between the components. These gaps may be configured to receive a plug 402 of a peripheral device in compliance with a standard, such as a Standard-A USB receptacle, a SATA receptacle, an HDMI receptacle, and so on. The tongue 108 of the expandable port may include one or more contacts 602 that are configured to transmit one or both of power or data between the computing device and a plug of a connected peripheral device.

The connector port may be opened with a user's finger by applying force to a surface of the roof 110 to open the connector port via the extension mechanism. In one or more implementations, the extension mechanism is a frictional hinge. Alternatively or additionally, the extension mechanism may include a combination of a latch that secures the connector port in a closed position and a bi-stable spring-loaded hinge that maintains stability of the connector port when it is in both a closed position and in an open position. The extension mechanism may alternatively comprise any one or a combination of a slider, a leaf spring, or a hinge.

While the connector port is in an open position, a second input is received at the opening mechanism or the connector port of the computing device (block 1106). For example, a second input may be received at a button of the computing device or from an input device configured to control a program module of the computing device to control a position of the connector port. As discussed, the second input may comprise a user pinching together the floor 106 and the roof 110 of the connector port 104. Alternatively, the second input may comprise a user pushing the roof 110 of the connector port.

In response to receiving the second input at the opening mechanism or the connector port of the computing device, the connector port is collapsed to a closed position inside the housing of the computing device (block 1108). For example, the connector port 104 may collapse to decrease or eliminate one or more gaps between the floor 106, the tongue 108, and the roof 110 as the connector port collapses to the closed position. In one or more implementations, the roof 110 of the connector port is configured to lie flush with a surface of a housing 118 of the computing device. In this manner, the connector port is configured to decrease in size as it transitions from the open position to a closed position, where it appears to be a uniform part of the housing.

Thus, a computing device may support an extendable connector port by eliminating or reducing gaps between components of the connector port when the connector port is in a closed position and expanding the port to an open position to comply with standard port dimensions. This expandability and collapsibility of the extendable connector port enables thin computing devices to support such a port without compromising a target thinness of the device housing.

Example System and Device

Figure 12:
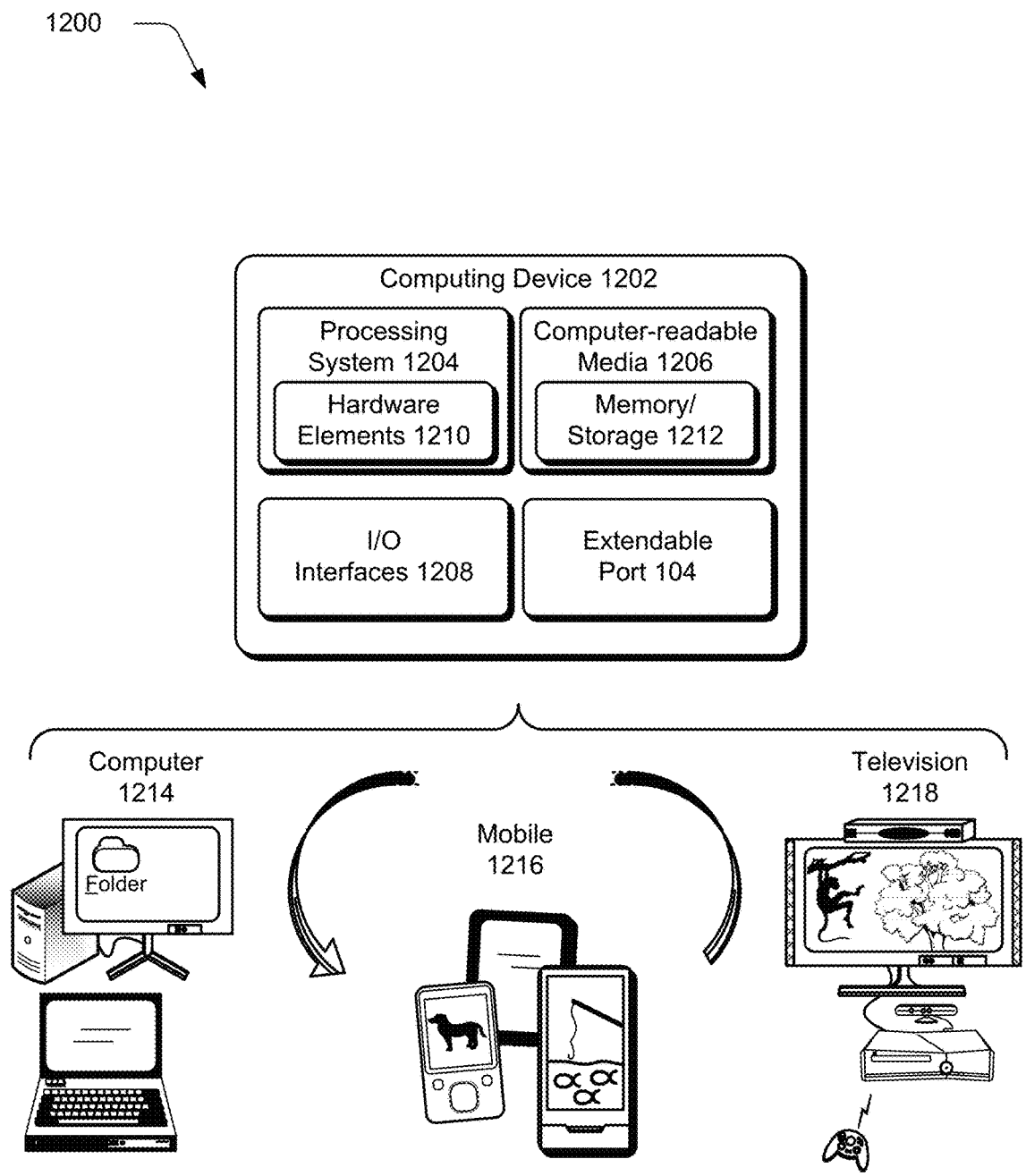
FIG. 12 illustrates an example system including various components of an example device that can be implemented as any type of computing device as described with reference to FIGS. 1-11 to implement the techniques described herein.

FIG. 12 illustrates an example system generally at 1200 that includes an example computing device 1202 that is representative of one or more computing systems and/or devices that may implement the various techniques described herein. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. The computing device may also include an extendable connector port 104 as described herein. Although not shown, the computing device 1202 may further include a system bus or other data and command transfer system that couples the extendable connector port 104 and various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signal-bearing medium, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on. Computing device 1202 may be a wearable device, such as a watch or a pair of eyeglasses, or may be included in a household, commercial, or industrial appliance.

The computing device 1202 may also be implemented as the mobile 1216 class of device that includes mobile devices, such as a mobile phone, portable music player, portable gaming device, a tablet computer, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein.

Conclusion and Example Implementations

Example implementations described herein include, but are not limited to, one or any combinations of one or more of the following examples:

In one or more examples, an apparatus includes a housing of a computing device; and an extendable connector port including a tongue, a roof disposed at a first distance from a first side of the tongue, and a floor disposed at a second distance from a second side of the tongue that is opposite the first side of the tongue, the extendable connector port configured to expand and collapse between: a closed position where the roof is configured to lie flush with a surface of the housing; and an open position where the port extends away from the surface of the housing, the first and second distances configured to increase as the extendable connector port extends from the closed position to the open position and decrease as the extendable connector port collapses from the open position to the closed position.

An example as described alone or in combination with any of the other examples described above or below, wherein the tongue includes one or more contacts configured to transmit one or both of data and power between the computing device and a peripheral device attached to the extendable connector port.

An example as described alone or in combination with any of the other examples described above or below, wherein the connector port is configured to extend rotationally away from the surface of the housing such that the extendable connector port is positioned at an acute angle relative to the surface of the housing in the open position.

An example as described alone or in combination with any of the other examples described above or below, wherein the extendable connector port is configured to extend rotationally away from the surface of the housing using a spring-loaded friction hinge that is stable when the extendable connector port is in the open position and stable when the extendable connector port is in the closed position.

An example as described alone or in combination with any of the other examples described above or below, wherein the extendable connector port is configured to extend orthogonally away from the surface of the housing, and the first and second distances are configured to increase when the tongue is positioned outside the housing.

An example as described alone or in combination with any of the other examples described above or below, wherein the roof is constructed of a same material as the housing of the computing device and the tongue is constructed as a flexible printed circuit.

An example as described alone or in combination with any of the other examples described above or below, wherein the extendable connector port is a Standard-A USB receptacle configured to receive a Standard-A USB plug when the extendable connector port is in the open position.

An example as described alone or in combination with any of the other examples described above or below, wherein a thickness of the housing of the computing device is less than ten millimeters.

An example as described alone or in combination with any of the other examples described above or below, wherein the tongue is in contact with the floor and in contact with the roof when the extendable connector port is in the closed position.

An example as described alone or in combination with any of the other examples described above or below, wherein the roof includes two sidewalls disposed on opposite sides of the roof, the sidewalls extending towards the floor and configured to shield the tongue.

An example as described alone or in combination with any of the other examples described above or below, wherein the floor is rotationally extendable away from the surface of the housing about a first pivot point, the tongue is rotationally extendable away from the surface of the housing about a second pivot point, and the roof is rotationally extendable away from the surface of the housing about a third pivot point, the pivot points configured such that the floor, tongue, and roof are oriented parallel to one another independent of a position of the connector port.

An example as described alone or in combination with any of the other examples described above or below, wherein the computing device is configured as a tablet computing device having a handheld form factor.

In one or more examples, a computing device includes a housing configured to be communicatively coupled to an input device; one or more modules disposed within the housing and implemented at least partially in hardware to perform one or more operations; and an extendable connector port disposed within the housing when in a closed position and configured to extend away from a surface of the housing to an open position, the extendable connector port configured to receive a Standard-A USB plug when positioned in the open position.

An example as described alone or in combination with any of the other examples described above or below, wherein the extendable connector port includes a floor, a tongue, and a roof that is configured to lie flush with a surface of the housing when the extendable connector port is in the closed position.

An example as described alone or in combination with any of the other examples described above or below, wherein the housing includes an indentation proximal to the extendable connector port, the indentation configured to expose a portion of a surface of a roof of the extendable connector port that is opposite the surface of the housing such that a user can open the extendable connector port with a finger.

An example as described alone or in combination with any of the other examples described above or below, wherein the housing includes a button disposed on a surface of the housing, the button configured to trigger a latch to release the extendable connector port from the closed position to the open position.

An example as described alone or in combination with any of the other examples described above or below, wherein the one or more operations include verifying a user's credentials and prohibiting the extendable connector port from opening prior to verification of the user's credentials.

In one or more examples, a method for extending and retracting an extendable connector port includes receiving a first input at an opening mechanism of a computing device; responsive to receiving the first input, extending a connector port away from a surface of a housing of the computing device to an open position, the connector port configured to receive a peripheral device plug while in the open position; receiving a second input at an opening mechanism of the computing device; and responsive to receiving the second input, retracting the connector port from the open position to a closed position where the connector port is disposed within the housing of the computing device.

An example as described alone or in combination with any of the other examples described above or below, wherein the connector port includes a roof, a tongue, and a floor that are configured to: extend away from the surface of the housing along a first axis that is orthogonal to the surface of the computing device; and extend along a second axis when the connector port is positioned outside the surface of the housing, the second axis being perpendicular to the first axis.

An example as described alone or in combination with any of the other examples described above or below, wherein the connector port is configured to rotationally extend away from the surface of the hosing such that the connector port is disposed at an acute angle relative to a surface of the computing device when the connector port is positioned in the open position.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. An apparatus comprising:
a housing of a computing device; and
an extendable connector port including a tongue, a roof disposed at a first distance from a first side of the tongue, and a floor disposed at a second distance from a second side of the tongue that is opposite the first side of the tongue, the extendable connector port configured to expand and collapse between:
a closed position where the roof is configured to lie flush with a surface of the housing and the tongue is in contact with both the roof and the floor; and
an open position where the port extends away from the surface of the housing, the first and second distances configured to increase as the extendable connector port extends from the closed position to the open position and decrease as the extendable connector port collapses from the open position to the closed position.

2. An apparatus as described in claim 1, wherein the tongue includes one or more contacts configured to transmit one or both of data and power between the computing device and a peripheral device attached to the extendable connector port.

3. An apparatus as described in claim 1, wherein the connector port is configured to extend rotationally away from the surface of the housing such that the extendable connector port is positioned at an acute angle relative to the surface of the housing in the open position.

4. An apparatus as described in claim 1, wherein the extendable connector port is configured to extend rotationally away from the surface of the housing using a spring-loaded friction hinge that is stable when the extendable connector port is in the open position and stable when the extendable connector port is in the closed position.

5. An apparatus as described in claim 1, wherein the extendable connector port is configured to extend orthogonally away from the surface of the housing, and the first and second distances are configured to increase when the tongue is positioned outside the housing.

6. An apparatus as described in claim 1, wherein the roof is constructed of a same material as the housing of the computing device and the tongue is constructed as a flexible printed circuit.

7. An apparatus as described in claim 1, wherein the extendable connector port is a Standard-A USB receptacle configured to receive a Standard-A USB plug when the extendable connector port is in the open position.

8. An apparatus as described in claim 1, wherein a thickness of the housing of the computing device is less than ten millimeters.

9. An apparatus as described in claim 1, wherein the roof includes two sidewalls disposed on opposite sides of the roof, the sidewalls extending towards the floor and configured to shield the tongue.

10. An apparatus as described in claim 1, wherein the floor is rotationally extendable away from the surface of the housing about a first pivot point, the tongue is rotationally extendable away from the surface of the housing about a second pivot point, and the roof is rotationally extendable away from the surface of the housing about a third pivot point, the pivot points configured such that the floor, tongue, and roof are oriented parallel to one another independent of a position of the connector port.

11. An apparatus as described in claim 1, wherein the computing device is configured as a tablet computing device having a handheld form factor.

12. A computing device comprising:
a housing configured to be communicatively coupled to an input device;
one or more modules disposed within the housing and implemented at least partially in hardware to perform one or more operations; and
an extendable connector port disposed within the housing when in a closed position and configured to extend away from a surface of the housing to an open position, the extendable connector port comprising:
a floor that is rotationally extendable away from a surface of the housing about a first pivot point;
a tongue that is rotationally extendable away from the surface of the housing about a second pivot point; and
a roof that is rotationally extendable away from the surface of the housing about a third pivot point, the pivot points configured such that the floor, the tongue, and the roof are oriented parallel to one another independent of a position of the extendable connector port.

13. A computing device as described in claim 12, wherein the roof is configured to lie flush with the surface of the housing when the extendable connector port is in the closed position.

14. A computing device as described in claim 12, wherein the housing includes an indentation proximal to the extendable connector port, the indentation configured to expose a portion of a surface of the roof of the extendable connector port that is opposite the surface of the housing such that a user can open the extendable connector port with a finger.

15. A computing device as described in claim 12, wherein the housing includes a button disposed on a surface of the housing, the button configured to trigger a latch to release the extendable connector port from the closed position to the open position.

16. A computing device as described in claim 12, wherein the one or more operations include verifying a user's credentials and prohibiting the extendable connector port from opening prior to verification of the user's credentials.

17. A method comprising:
receiving a first input at an opening mechanism of a computing device;
responsive to receiving the first input, extending a connector port away from a surface of a housing of the computing device to an open position that is configured to receive a peripheral device plug by:
extending a roof, a tongue, and a floor of the connector port away from the surface of the housing along a first axis that is perpendicular to the surface of the computing device; and
expanding the roof, the tongue, and the floor of the connector port along a second axis that is perpendicular to the first axis when the connector port is positioned outside the surface of the housing;
receiving a second input at an opening mechanism of the computing device; and
responsive to receiving the second input, retracting the connector port from the open position to a closed position where the connector port is disposed within the housing of the computing device.

18. A method as described in claim 17, wherein the tongue is in contact with both the roof and the floor when the connector port is in the closed position.

19. A method as described in claim 17, wherein the floor, the tongue, and the roof are oriented parallel to one another independent of a position of the connector port.

20. A method as described in claim 17, further comprising verifying a user's credentials and prohibiting the connector port from opening prior to verification of the user's credentials.

* * * * *